(12) United States Patent
Geisler et al.

(10) Patent No.: US 8,454,915 B2
(45) Date of Patent: Jun. 4, 2013

(54) SELECTIVE LEACH RECOVERY OF MINERALS FROM COMPOSITE ORES

(75) Inventors: Robert A. Geisler, Toronto (CA); Madhav P. Dahal, Toronto (CA)

(73) Assignee: Yava Technologies Inc., Toronto, Ontario (CA)

( * ) Notice: Subject to any disclaimer, the term of this patent is extended or adjusted under 35 U.S.C. 154(b) by 0 days.

(21) Appl. No.: 13/390,960

(22) PCT Filed: Aug. 17, 2010

(86) PCT No.: PCT/CA2010/001263
§ 371 (c)(1),
(2), (4) Date: Mar. 7, 2012

(87) PCT Pub. No.: WO2011/020181
PCT Pub. Date: Feb. 24, 2011

(65) Prior Publication Data
US 2012/0177551 A1    Jul. 12, 2012

(30) Foreign Application Priority Data
Aug. 19, 2009  (CA) .................................... 2676273

(51) Int. Cl.
*C01G 21/00*    (2006.01)
(52) U.S. Cl.
USPC ................ 423/49; 423/98; 423/109; 423/155
(58) Field of Classification Search
USPC ...................................... 423/49, 98, 109, 155
See application file for complete search history.

(56) References Cited

U.S. PATENT DOCUMENTS

| | | | |
|---|---|---|---|
| 3,347,662 A | 10/1967 | Snyder | |
| 3,868,439 A | 2/1975 | Wadsworth | |
| 4,043,599 A | 8/1977 | Lingane et al. | |
| 4,376,098 A | 3/1983 | Yan | |
| 4,500,398 A | 2/1985 | Cole, Jr. et al. | |
| 5,523,066 A | 6/1996 | Geisler et al. | |
| 6,517,701 B1 * | 2/2003 | Geisler | .......................... 205/538 |
| 6,726,828 B2 | 4/2004 | Turner et al. | |
| 2006/0002834 A1 | 1/2006 | Brierley et al. | |

OTHER PUBLICATIONS

International Search Report of PCT/CA2010/001263, date of mailing Jan. 5, 2011.
Chen, AA, Kinetics of Leaching Galena Concentrates with Ferric Fluosilicate Solution, UBC MASc Thesis, Oct. 1992. (ISR).

* cited by examiner

*Primary Examiner* — Steven Bos
(74) *Attorney, Agent, or Firm* — Collard & Roe, P.C.

(57) ABSTRACT

Calcium (Ca), manganese (Mn) and magnesium (Mg) carbonate plus lead (Pb) and zinc (Zn) sulphide minerals in a permeable host, crushed ore, concentrates or as mine discharge tailing are selectively solution mined (in-situ or ex-situ) with a selected acid e.g. acetic acid to extract Ca, Mn, and Mg followed by multivalent oxidizing salts e.g. ferric salts to extract Pb and Zn sequentially. For in-situ leaching, an inter relationship has been identified between pressure, temperature, target depth and leachate concentration such that carbonate leaching is performed in a manner to prevent carbon dioxide gas ($CO_2$) discharge thereby plugging host rock permeability avenues to preclude further leaching. This requires controlling the rate of acetic acid leaching to be in step with availability of solution to dissolve the resulting discharged $CO_2$. Sulphide leaching is subsequently conducted on the carbonate-depleted host. The two resulting leachates are chemically treated to selectively recover extracted minerals as value added industrially ready products. The in situ method is particularly advantageous in preparing the high purity manganese products necessary for lithium ion batteries because it prevents occurrence of very fine metallic particles in the products that may happen during conventional mining. Alternatively, the in situ carbonate recovery steps can be independently employed; all in an environmentally friendly manner.

5 Claims, No Drawings

SELECTIVE LEACH RECOVERY OF MINERALS FROM COMPOSITE ORES

CROSS REFERENCE TO RELATED APPLICATIONS

This application is the National Stage of PCT/CA2010/001263 filed on Aug. 17, 2010, which claims priority under 35 U.S.C. §119 of Canadian Application No 2,676,273 filed on Aug. 19, 2009, the disclosure of which is incorporated by references. The international application under PCT article 21(2) was published in English.

FIELD OF THE INVENTION

This invention relates to a mineral recovery process employing target selective in situ or ex situ leaching to recover minerals, some of which occur as carbonates and the others as sulphides and in the former case from a permeable host. Mineral recovery is performed from the host in two consecutive steps: (1) extraction of calcium, manganese, magnesium and associated carbonate minerals leaching with e.g. dilute acetic acid followed by (2) extraction of lead, zinc and associated sulphide minerals by again leaching the host now with e.g. a ferric salt. During (1), the strength of the acetic acid is adjusted according to the subsurface conditions to prevent creating excess $CO_2$ gas and thereby blocking bedrock permeability avenues to prevent acid delivery for subsequent mineral digestion. The leachant concentration is a function of target temperature plus atmospheric pressure (depth). Ex situ targets do not require pressure and temperature adjustments. Re-circulation of leachant may be necessary to completely extract the total amount of target minerals in the host. The carbonate mineral depleted host is then re-leached in step (2) with e.g. a ferric salt to recover its remaining Pb, Zn and associated sulphide minerals. The leachate from steps (1) and (2) are separately treated chemically to selectively recover their dissolved constituents to yield high value industrial products ready for sale. The technology has a particular advantage in the recovery of manganese for use in lithium ion batteries because it prevents formation of fine metallic particles in the manganese product which happens during conventional mining recovery and consequently could potentially short circuit batteries for which it is used.

BACKGROUND OF THE INVENTION AND PRIOR ART

The main traditional industrial use for calcium has been in its carbonate form ($CaCO_3$) as a filler for paper and rubber. Recently its use has risen as a filler for plastics and paints in the form of increasingly smaller particles in the sub nanometer range in order to provide improved characteristics to its hosts resulting from the diminished size of the calcium material. In some instances the improvements to the host have been sufficiently pronounced to warrant dramatic increase in the price of the calcium material. For use as a filler the calcium material attributes of main concern to the buyer are particle size, uniformity and packing density which are the chief controls of performance. Calcium is also widely utilized as a soil supplement or fertilizer and to a lesser extent in pharmaceuticals.

Calcium occurs mainly as calcium carbonate referred to as limestone, or in the form of calcium magnesium carbonate referred to as dolomite. Both are marine deposits usually of substantial size. They are generally mined on a large scale by open pit and the individual components selectively recovered by mechanical or chemical means.

The chief form of manganese ore is as manganese dioxide (pyrolusite), $MnO_2$. Deposits are usually as veins recovered by underground mining. The main use of manganese is as a steel alloy. It is recovered in large pieces, crushed to useable size and fed with iron ore into blast furnaces to make steel. In this way it does not command a very high price. It also has some chemical uses. Recently manganese has become increasingly important however as the principal component in rechargeable batteries utilized for a growing variety of industrial, electronic and power equipment extending to automobile batteries with concomitant increase in price. The desired form for batteries is as lithiated manganese dioxide (Li $Mn_2O_4$) referred to as LMD.

Pyrolusite can and is being used for this purpose. It is mined, crushed, dissolved into a solution and electrochemically recovered as electrolytic manganese dioxide (EMD). This must then be re-crushed and treated with a lithium compound at high temperature to form LMD. This process is a complicated and costly procedure. In addition it has been found that the resulting LMD frequently contains minute metal particles that apparently could cause the batteries made from it to short circuit. The particles might not be removed electromagnetically nor can their presence be completely identified by scanning electron micrograph (SEM). The solution to the problem so far has been to test all new batteries employing LMD and discard those that are found to be faulty. Alternatively multiple treatment steps may be utilized to purify $MnO_2$ as a precursor material.

We have found to our surprise that manganese as carbonate veins that cannot be economically mined normally but which exist in geology with sufficient permeability can be advantageously recovered by in situ leach mining (ISLM) as leachate producing high purity LMD. Such solution is free of metal particles because it does not entail conventional mining or crushing and thus have the possibility of causing electrical short circuit problems in batteries for which it is employed. Moreover the presence of calcium carbonate with the manganese that normally occurs in such settings offers the opportunity for its recovery as well with the manganese thereby further increasing the economics of the process.

A patent search disclosed two methods, one proposed by Geisler in U.S. Pat. No. 5,523,066 and the other by Turner in U.S. Pat. No. 6,726,828, that describe use of ISLM utilizing a mixture of acetic acid and hydrogen peroxide (for sulphide oxidation) to recover Ca, Mn, Pb and Zn as a combined leachate from a permeable geological host. Both methods rely on a separate oxidant (i.e. peroxide) and take no precautions against progressive subsurface blockage of flow-channels preventing further leaching. Neither of these methods suggest what is proposed herein.

Another patent noted (U.S. Pat. No. 4,500,398) treated sulfide ore with fluosilicic acid plus an oxidizing agent, to release the metal values.

SUMMARY OF THE INVENTION

The invention includes a process of leaching mineral values from ores having metal carbonate and metal sulfide components, comprising: leaching the carbonates with an acid leachant selected to dissolve the carbonates but not the sulfides at a rate chosen to avoid in situ release of $CO_2$ gas and subsequently leaching the sulfides with an oxidative leachant to dissolve the sulfides followed by selective recovery of desired metal values from the separate leachates.

The ore-derived particulates may include crushed ores, ore concentrates and mine discharge tailings.

Various acids may be selected for step a) leachant e.g. acetic, formic, nitric, sulphuric, hydrochloric, fluosilicic acid and fluoboric acid.

For step b), the oxidative leachant comprises a selected salt of a metal having multiple valence states, and in the highest valence state.

Preferred salts for the step b) oxidative leachant include ferric fluosilicate, ferric fluoborate, ferric sulphate and ferric nitrate.

Leach step b) has been found to be more efficient if a rinse step is inserted between steps a) and b).

In a broad aspect, the invention comprises the ore body carbonate acid leach (independent of the sulfide leach) controlled to a leach rate that avoids the release of $CO_2$ gas in the ore body and maintains the ore permeability. The leach rate is controlled by adjusting leachant pressure, temperature and acid concentration to provide a leach rate below that where $CO_2$ gas begins to be released. This has been found to maintain the ore body permeability. The threshold of $CO_2$ gas release can be found by comparing the gas dissolved in the leachate with the maximum solubility under temperature and pressure employed underground.

DETAILED DESCRIPTION OF PREFERRED EMBODIMENTS

In one embodiment Ca, Mn and Pb (in sulfide form) are recovered from a carbonate host containing same by means of two-stage ISL mining techniques well known to those skilled in the art. The Ca and Mn are initially recovered by employing a dilute acetic acid leach. Following completion of this step, the wellfield being leached is rinsed with water to remove all traces of acetic acid and the deposit is re-leached with ferric fluorosilicate solution to recover remaining Pb. The chemical reactions of two sequential leaching steps are depicted below as (A) and (B).

INITIAL LEACH (A)

(A) Carbonate Leaching Reactions

Calcium and manganese carbonates react with acetic acid leachant to form soluble calcium and manganese acetates.

$$CaCO_3+2CH_3COOH=(CH_3COO)_2Ca+CO_2+H_2O$$

$$MnCO_3+2CH_3COOH=(CH_3COO)_2Mn+CO_2+H_2O$$

(A) Calcium Recovery Reactions

Calcium is selectively precipitated from the leachate consisting of a mixture of calcium and manganese acetate employing sulfuric acid. This is possible because calcium sulfate is insoluble whereas manganese sulfate is a soluble compound. This step also regenerates the leachant (acetic acid). Calcium sulfate is subsequently converted to precipitated calcium carbonate by reacting it with ammonium carbonate. Ammonium sulfate is produced as a high purity saleable byproduct during this process.

$$(CH_3COO)_2Ca+H_2SO_4=CaSO_4+2CH_3COOH$$

$$CaSO_4+(NH_4)_2CO_3=CaCO_3+(NH_4)_2SO_4$$

(A) Manganese Recovery Reactions

Calcium stripped leachate consisting mainly of manganese acetate is treated with potassium permanganate to selectively oxidize manganese to manganese dioxide. Manganese dioxide thus obtained may be used as a precursor material to make lithiated manganese dioxide by heating it with lithium carbonate at higher temperature. Manganese could also be selectively recovered by solvent extraction.

$$3Mn^{2+}+2KMnO_4+2H_2O \rightarrow 5MnO_2+4H^++2K^+$$

The regenerated leachant is injected underground forming a closed loop operation.

Subsequent Leach (B)

(B) Lead Leaching Reaction Using Ferric Fluosilicate Leachant $$Fe_2(SiF_6)_3+PbS->2FeSiF_6+PbSiF_6S$$

In a preferred aspect lead is recovered as high purity lead metal by electrowinning from the resulting leachate. The electrowinning process regenerates the original leachant by oxidizing ferrous fluosilicate to ferric fluosilicate at the anode and the ferric fluosilicate is recovered for recycle.

The invention claimed is:

1. A process of leaching mineral values from a permeable ore body or from particulates derived from an ore, the ore having metal carbonate and metal sulfide components, comprising:
    a) leaching first the metal carbonate from the ore with an aqueous leachant comprising an acid selected from the group consisting of acetic acid, formic acid, nitric acid, sulphuric acid, hydrochloric acid, fluoboric acid and fluosilicic acid and recovering at least one of manganese, calcium and magnesium; and
    b) leaching metal sulfides from the ore with an aqueous leachant comprising at least one ferric salt selected from the group consisting of ferric fluosilicate, ferric fluoborate, ferric sulfate, and ferric nitrate to oxidize sulfides into soluble oxidation products and recovering at least one of lead and zinc.

2. The process of claim 1, wherein leaching is carried out in situ in a permeable ore body.

3. The process of claim 2, wherein between steps a) and b) leached in situ strata are rinsed to remove acid leachant remaining from step a).

4. The process of claim 1, wherein leaching is carried out on ore-derived particulates selected from the group consisting of crushed ore, ore concentrates and mine discharge tailings.

5. The process of claim 1, wherein the acid is acetic acid.

* * * * *